May 15, 1934.     I. C. KLINGLER     1,958,757
RAKE CLEANER
Filed Jan. 18, 1933
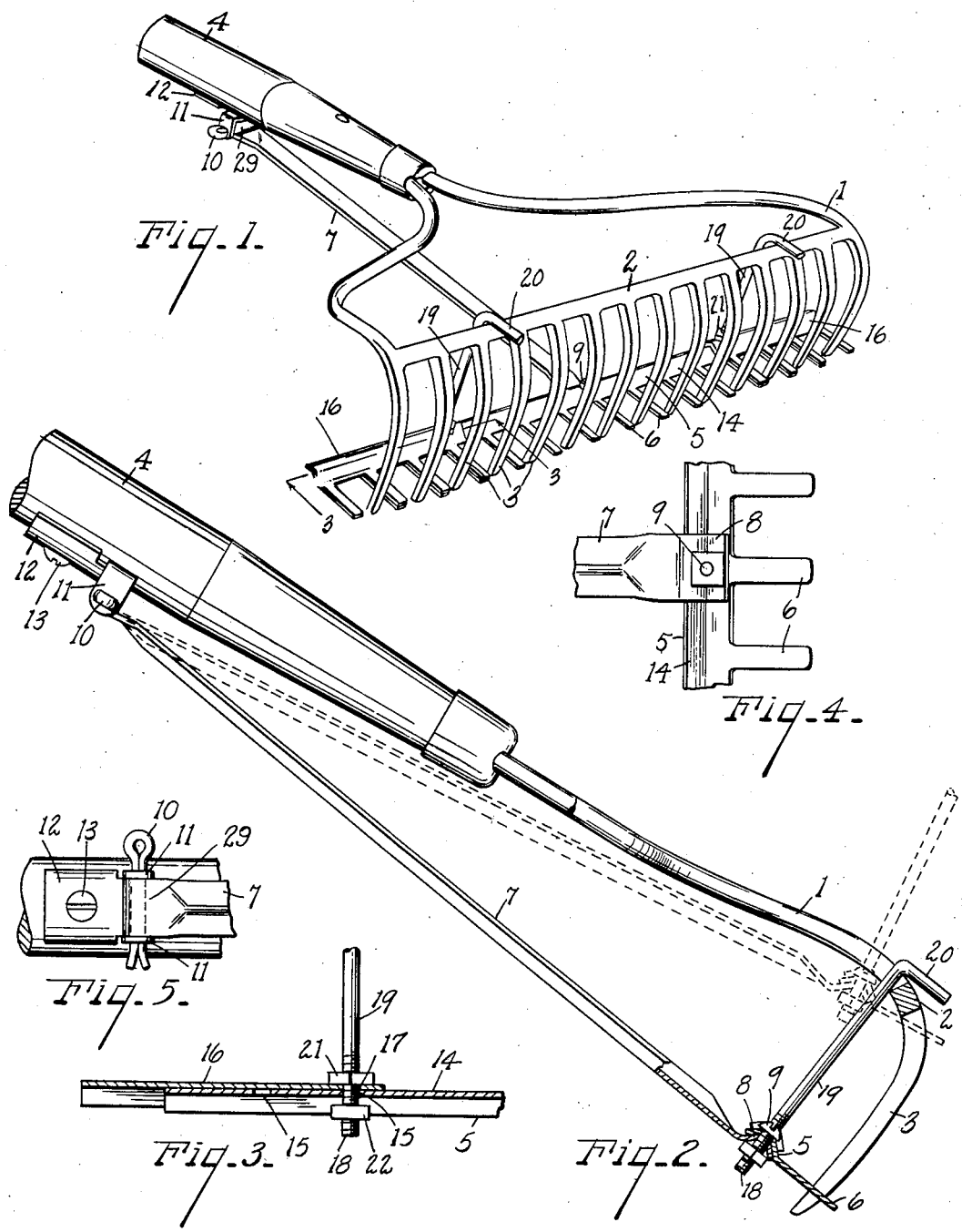
INVENTOR
Ira C. Klingler
BY
Chappell Earl
ATTORNEYS Patented May 15, 1934

1,958,757

UNITED STATES PATENT OFFICE 1,958,757

RAKE CLEANER

Ira C. Klingler, Elkhart, Ind.

Application January 18, 1933, Serial No. 652,249

6 Claims. (Cl. 55—146)

The main objects of this invention are:

First, to provide a rake tooth cleaner in which the clearing or stripper bar is adjustable in length whereby to readily adapt the cleaner to rakes of various sizes.

Second, to provide a rake cleaner having improved means associated therewith for limiting downward movement and the objectionable lateral swaying movement of the cleaner relative to the rake.

Third, to provide a structure having these advantages, which is strong and durable and at the same time very economical.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary view in perspective of a rake provided with a rake tooth cleaner embodying the features of my invention.

Fig. 2 is an enlarged fragmentary view partially in section, the stripper bar being shown in its lowered position by full lines and in its raised position by dotted lines.

Fig. 3 is an enlarged fragmentary section on a line corresponding to line 3—3 of Fig. 1.

Fig. 4 is an enlarged inverted fragmentary view showing the connection between the shank and the stripper bar.

Fig. 5 is an enlarged inverted fragmentary view showing the connection between the shank and the attaching bracket.

Referring to the drawing, the rake head 1 is of the well known type in which the metal cross bar 2 is provided with a plurality of teeth 3 and a handle 4 of wood.

I provide a stripper bar 5 having spaced fingers 6 disposed to project forwardly between the teeth of the rake. The stripper bar and its teeth are preferably formed as a stamping, the bar being of channel or V-section. The stripper bar is provided with a shank 7 secured to the stripper bar centrally thereof, the forward end of the shank being upset at 8 to be received by the channel-like or V-section of the stripper bar. The bolt 9 secures the stripper bar and shank in assembled relation. The upset of the shank fitting within the channel of the stripper bar renders the single bolt effective as a securing means.

At its rear end, the shank is provided with an upturned knuckle 29 to receive the cotter pin 10 which is arranged through the pair of spaced ears 11, 11 of the bracket 12. The bracket is secured to the handle by means of the screw 13. With the parts thus arranged, the rake cleaner may be readily removed from the rake by simply pulling the cotter pin. The ears 11 engage the sides of the shank and act to prevent lateral swaying movement of the cleaner relative to the rake head.

The stripper bar comprises a central member 14 of V-section having a bolt hole 15, 15 near the ends thereof, the holes being spaced apart a distance equal to the space between successive fingers 6. A pair of end members 16 of V-section overlap the ends of the central member and are each provided with a bolt hole 17 near the inner end thereof for selective registration with the holes 15 to vary the length of the stripper bar for rakes of different sizes.

The central and end members are secured together in assembled relation by means of the bolts 18 which are provided with extensions 19 having forwardly projecting arms 20 at their upper ends engageable with the rake cross bar to limit the downward movement of the stripper bar relative to the lower ends of the rake teeth. Each bolt is provided with an upper nut 21 and a lower nut 22 engaging the end and central members respectively of the stripper bar.

To change the length of the stripper bar, it is only necessary to back off the upper nuts 21, unscrew the lower nuts 22 and remove the bolts from the registering bolt holes. This is a great convenience to purchasers of my rake cleaner, inasmuch as the same may be quickly adapted to a rake of any standard size. Also, my improvement is of great advantage to dealers, inasmuch as it is necessary to stock cleaners of only one size, and further it is not necessary to ask the customer the size of his rake. This latter question, in the past, often resulted in the loss of many sales.

With the parts of my improved rake cleaner formed and arranged in the manner described above, I provide a device which is very economical to produce and assemble and the parts may be furnished as an attachment to be applied by the user to rakes of standard types of various sizes now in use. The stripper acts by gravity to remove ordinary accumulations, but should the rake become clogged so that gravity is not sufficient, the stripper may be actuated by engaging the ends of its fingers with the ground or by inverting the rake and engaging the arms 20 with the ground.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. A rake cleaner comprising a bracket adapted to be secured to the rake handle and having a pair of spaced ears, a cotter pin extending through said ears, a shank pivoted at its rear end to said cotter pin with the ears engaging the sides of said shank to limit lateral swaying movement thereof, and a stripper bar secured at its center to the forward end of said shank and having forwardly extending fingers to project between the rake teeth, said stripper bar comprising a central member of V-section having spaced bolt holes near its ends, a pair of end members of V-section overlapping the ends of said central member and each having a bolt hole for individual registry with the bolt holes in said central member, said central member bolt holes being spaced apart a distance equal to the space between successive fingers, and bolts disposed through registering central and end member bolt holes and securing said members in assembled relation, said bolts having extensions provided with forwardly extending arms engageable with the rake cross bar to limit the downward movement of the stripper bar relative to the ends of the rake teeth.

2. A rake cleaner comprising a bracket adapted to be secured to the rake handle and having a pair of spaced ears, a pin extending through said ears, a shank pivoted at its rear end to said pin with the ears engaging the sides of said shank to limit lateral swaying movement thereof, and a stripper bar secured at its center to the forward end of said shank, said stripper bar comprising a central member of V-section having spaced bolt holes near its ends, a pair of end members of V-section overlapping the ends of said central member and each having a bolt hole for individual registry with the bolt holes in said central member, and bolts disposed through registering central and end member bolt holes and securing said members in assembled relation, said bolts having extensions provided with forwardly extending arms engageable with the rake cross bar to limit the downward movement of the stripper bar.

3. A rake cleaner provided with a stripper bar comprising a central member of channel-section having spaced bolt holes near its ends, a pair of end members of channel-section having spaced bolt holes near its ends, a pair of end members of channel-section overlapping the ends of said central member and each having a bolt hole for individual registry with the bolt holes in said central member, and bolts disposed through registering central and end member bolt holes and securing said members in assembled relation, said bolts having extensions provided with forwardly extending arms engageable with the rake cross bar to limit the downward movement of the stripper bar relative to the ends of the rake teeth.

4. A rake cleaner comprising a bracket adapted to be secured to the rake handle, a shank pivoted at its rear end to said bracket, and a stripper bar secured to the forward end of said shank, said stripper bar comprising a central member having spaced holes near its ends, a pair of end members overlapping the ends of said central member and each having a hole for individual registry with the bolt holes in said central member, and means disposed through registering central and end member holes and securing said members in assembled relation, said means having extensions provided with forwardly extending arms engageable with the rake head to limit the downward movement of the stripper bar.

5. A rake cleaner comprising a shank pivoted at its rear end to the rake handle, and a stripper bar secured to the forward end of said shank, said stripper bar comprising a central member, a pair of end members overlapping the ends of said central member, and means securing said members in assembled relation, said means having extensions provided with arms engageable with the rake head to limit the downward movement of the stripper bar.

6. A rake cleaner provided with a stripper bar comprising a plurality of longitudinally adjustable overlapping sections, and means for adjustably securing said sections in assembled relation, whereby to adjust the length of said stripper bar, said means including an extension provided with means engageable with the rake head to limit the downward movement of the stripper bar.

IRA C. KLINGLER.